(12) United States Patent
Thomaschewski

(10) Patent No.: US 9,511,865 B2
(45) Date of Patent: Dec. 6, 2016

(54) AIRCRAFT SEAT COMPRISING A SEAT ASSEMBLY

(71) Applicant: LUFTHANSA TECHNIK AG, Hamburg (DE)

(72) Inventor: Oliver Thomaschewski, Norderstedt (DE)

(73) Assignee: LUFTHANSA TECHNIK AG, Hamburg (DE)

( * ) Notice: Subject to any disclaimer, the term of this patent is extended or adjusted under 35 U.S.C. 154(b) by 0 days.

(21) Appl. No.: 14/403,477

(22) PCT Filed: May 24, 2013

(86) PCT No.: PCT/EP2013/001530
§ 371 (c)(1),
(2) Date: Nov. 24, 2014

(87) PCT Pub. No.: WO2013/174520
PCT Pub. Date: Nov. 28, 2013

(65) Prior Publication Data
US 2015/0151840 A1 Jun. 4, 2015

(30) Foreign Application Priority Data
May 24, 2012 (DE) .................. 10 2012 208 721

(51) Int. Cl.
*B64D 11/06* (2006.01)
*B60N 2/42* (2006.01)
*B60N 2/427* (2006.01)

(52) U.S. Cl.
CPC ......... *B64D 11/0619* (2014.12); *B60N 2/4221* (2013.01); *B60N 2/4228* (2013.01);
(Continued)

(58) Field of Classification Search
CPC ... B60N 2/68; B60N 2/2222; B60N 2002/022; B60N 2/427; B60N 2/42709; B60N 2/24; B60N 2/42736; B60N 2/4235; B64D 11/0647; B64D 25/04; B64D 11/064; B64D 11/0648; B64D 11/0696; B64D 2011/0644; B64D 11/0619; B64D 11/0649; B64D 11/06; B60R 21/207
(Continued)

(56) References Cited

U.S. PATENT DOCUMENTS 2,346,895 A    5/1942 Bergman
2,401,748 A   10/1944 Dillon
(Continued)

FOREIGN PATENT DOCUMENTS

DE    1022472 B   *  1/1958  ............. B64D 25/04
DE    2723722 A1  * 12/1978  ............... A47C 5/12
(Continued)

*Primary Examiner* — Beth Stephan
(74) *Attorney, Agent, or Firm* — Saliwanchik, Lloyd & Eisenschenk

(57) ABSTRACT

The invention relates to an aircraft seat having a seat assembly, wherein the seat assembly comprises a seat base and a seat surface assembly. The seat surface assembly is translationally movable in one direction relative to the seat base and can be blocked in at least one position. A force-limiting device is provided which, when activated, allows a relative movement between the seat base and the blocked seat surface assembly. Furthermore, the aircraft seat has a rocking ability about a transverse axis between the seat base and at least parts of the seat surface assembly, wherein the rocking ability of the seat surface assembly can be blocked by a blocking element. A force-limiting device is provided, which, when activated, allows a rocking movement of the blocked seat surface assembly.

9 Claims, 3 Drawing Sheets

(52) U.S. Cl.
CPC ....... *B60N 2/4242* (2013.01); *B60N 2/42709* (2013.01); *B60N 2/42736* (2013.01); *B64D 11/06* (2013.01); *B64D 11/064* (2014.12); *B64D 11/0648* (2014.12); *Y02T 50/46* (2013.01)

(58) Field of Classification Search
USPC ........ 297/216.19, 216.2, 216.16, 314, 302.1, 297/302.5, 325, 341, 344.1, 344.11, 297/354.1, 452.12; 244/118.6, 122 R
See application file for complete search history.

(56) References Cited

U.S. PATENT DOCUMENTS

| | | | | |
|---|---|---|---|---|
| 3,874,727 A * | 4/1975 | Mehnert | ................ | A47C 1/033 297/320 |
| 3,877,750 A * | 4/1975 | Scholpp | ................ | A47C 1/143 297/284.3 |
| 4,379,589 A * | 4/1983 | Marino | ................ | A47C 7/448 248/621 |
| 4,451,085 A * | 5/1984 | Franck | ................ | A47C 1/03255 297/285 |
| 4,585,272 A * | 4/1986 | Ballarini | ................ | A47C 3/12 297/284.3 |
| 4,913,493 A * | 4/1990 | Heidmann | ............. | A47C 7/448 297/285 |
| 5,013,089 A * | 5/1991 | Abu-Isa | ................ | A47C 7/282 297/224 |
| 5,320,410 A * | 6/1994 | Faiks | ..................... | A47C 7/445 297/285 |
| 5,340,197 A * | 8/1994 | Vogtherr | ................ | A47C 3/12 297/285 |
| 5,366,269 A | 11/1994 | Beauvais | | |
| 5,599,069 A * | 2/1997 | Lorbiecki | ............... | A47C 3/12 297/440.2 |
| 5,657,950 A | 8/1997 | Han et al. | | |
| 5,918,935 A * | 7/1999 | Stulik | ................ | A47C 1/03255 248/597 |
| 6,059,369 A * | 5/2000 | Bateson | ................ | B29C 70/222 297/452.18 |
| 6,193,318 B1 * | 2/2001 | Becker | ................... | B60N 2/686 297/452.15 |
| 6,257,663 B1 * | 7/2001 | Swierczewski | ...... | B60N 2/4214 297/216.16 |
| 6,565,151 B2 * | 5/2003 | Jarnail | ................ | B60N 2/4221 244/122 R |
| 6,609,753 B2 * | 8/2003 | Schmidt-Schaeffer | .. | A47C 7/28 297/284.2 |
| 6,779,846 B2 * | 8/2004 | Spendlove | ............. | A47C 7/445 297/296 |
| 6,983,989 B1 * | 1/2006 | Veine | ................... | B60N 2/4885 297/216.12 |
| 7,140,682 B2 * | 11/2006 | Jaeger | ................. | B60N 2/0224 297/329 |
| 7,726,607 B2 | 6/2010 | Schumacher et al. | | |
| 7,926,879 B2 * | 4/2011 | Schmitz | ............. | A47C 1/03255 297/340 |
| 7,992,936 B2 * | 8/2011 | Schmitz | ............. | A47C 1/03255 297/285 |
| 8,282,172 B2 * | 10/2012 | Schmitz | ............. | A47C 1/03255 297/452.12 |
| 8,408,643 B2 | 4/2013 | Honnorat | | |
| 2001/0038233 A1 * | 11/2001 | Eklind | ................ | B60N 2/4221 297/216.13 |
| 2004/0066073 A1 * | 4/2004 | Wagner | ................ | B60N 2/1615 297/337 |
| 2010/0045080 A1 * | 2/2010 | Haugan | ................... | A47C 5/005 297/183.5 |
| 2010/0117419 A1 * | 5/2010 | Schmitz | ............. | A47C 1/03255 297/284.1 |
| 2010/0289308 A1 * | 11/2010 | Schmitz | ............. | A47C 1/03255 297/300.2 |
| 2011/0042514 A1 * | 2/2011 | Ehlers | ................ | B64D 11/0696 244/122 R |
| 2012/0139302 A1 * | 6/2012 | Estevenin | .......... | B64D 11/0015 297/162 |
| 2012/0228911 A1 * | 9/2012 | Piretti | ...................... | A47C 3/12 297/285 |

FOREIGN PATENT DOCUMENTS

| | | | | |
|---|---|---|---|---|
| DE | 102004007171 A1 * | 9/2005 | .......... | B60N 2/4221 |
| DE | 20 2005 012 230 | 12/2005 | | |
| DE | 102008039166 A1 * | 2/2010 | ............ | B60N 2/015 |
| DE | 102012208719 A1 * | 11/2013 | ............ | B64D 11/06 |
| EP | 1 598 270 | 11/2005 | | |
| EP | 2 305 561 | 4/2011 | | |
| WO | WO-01/12464 | 2/2001 | | |
| WO | WO-2006/124555 | 11/2006 | | |
| WO | WO-2010/041235 | 4/2010 | | |
| WO | WO-2011/073315 | 6/2011 | | |

* cited by examiner

AIRCRAFT SEAT COMPRISING A SEAT ASSEMBLY

CROSS-REFERENCE TO RELATED APPLICATIONS

The present application is the U.S. National Stage Application of International Patent Application No. PCT/EP2013/001530, filed on May 24, 2013, which claims priority to German Patent Application No. 10 2012 208 721.4, filed on May 24, 2012, both of which are hereby incorporated by reference herein in their entirety, including any figures, tables, or drawings.

FIELD OF THE INVENTION

The invention relates to an aircraft seat comprising a seat assembly, wherein the seat assembly comprises a seat base and a seat surface assembly. The seat surface assembly is translationally displaceable in relation to the seat base in one direction and can be blocked in at least one position.

BACKGROUND OF THE INVENTION

Aviation regulations, according to which a dynamic passenger load may not be exceeded under defined conditions, exist for the event of a possible crash. For this it is necessary for the aircraft seat to provide a possibility for limiting the forces acting on the passenger, resulting from the accelerations occurring, in the event of a crash by absorbing kinetic energy.

Seat substructures for aircraft seats, which have a metallic frame as the force-transmitting element, are known from the prior art. The frame generally has a framework structure. An aluminium alloy is typically used as the material. The rigidity of the seat substructure is structurally configured in such a way that the forces occurring on the seated passenger are limited by the deformation of the seat substructure in the event of a crash.

The plastic deformation takes place distributed over the entire seat substructure. Upon translational accelerations or the resulting forces in the event of a corresponding crash, a rotational movement of the aircraft seat is adjusted about a virtual centre of rotation, which is located low in the direction of the floor plane relative to the seat surface of the aircraft seat. This leads, in the upper region of the seat, to an excessive translational displacement and therefore to a large movement envelope, which, as a movement space, has to be kept clear of further components in order to prevent collisions with possible injury consequences for the passenger.

Alternatively, the possibility exists of keeping the free space around the passenger so small that the path covered, for example, by the head in the event of a crash is so short that the head, by the time it has impinged on the rigidly installed part in the movement envelope, for example a chair or table, has not yet built up any critical energy leading to injuries. This either produces, for example, narrow seating or a very large free space. Both variants are disadvantageous because they lead to losses of comfort or to a high space requirement in the spatially limited cabin. Furthermore, padding of all the parts present in the movement envelope is impractical.

BRIEF SUMMARY OF THE INVENTION

The object of the invention is to disclose an aircraft seat, which has a defined and small movement envelope in the event of a crash.

To achieve the object, an aircraft seat with a seat assembly is proposed, the seat assembly comprising a seat base and a seat surface assembly. The seat surface assembly is translationally displaceable in relation to the seat base in one direction and can be blocked in at least one position. According to the invention, a force-limiting device is provided, which, upon an activation, allows a relative movement between the seat base and the blocked seat surface assembly.

The force-limiting device with a relative movement between the seat base and seat surface assembly allows the kinetic energy of a passenger on the seat to be reduced in the event of a crash, the reduction substantially not taking place by a deformation of the supporting structure in the region of the seat substructure. The energy reduction takes place in the force-limiting device and may take place directed in the load direction, without a rotational movement about a centre of rotation being introduced in the floor region of the aircraft seat. The force-limiting device reduces the loads for a passenger, so injuries can be avoided. Furthermore, the force-limiting device has a positive effect on the structure of the aircraft seat, as said seat is also only loaded by the force-limiting device with limited and thus defined forces, so a structure failure due to load peaks can be prevented. The structural configuration of the seat substructure can thus be configured in a targeted manner for the force values limited by the force-limiting device, and this allows a light mode of construction.

The force-limiting device is preferably arranged between the seat base and the seat surface assembly. As a result, a force transmission can be achieved with short load paths and short resulting levers. In addition, the corresponding load paths of the seat surface assembly, the backrest and/or the anchor points of a safety belt are advantageously short in this case, and this may be advantageous for a light mode of construction.

The aircraft seat is preferably substantially free of rotation in relation to a cabin floor in the event of an accident with translational loads. The structural reduction of the rotational movement in relation to the cabin floor, in particular in the case of the relative movement between the seat base and seat surface assembly, reduces the movement envelope and therefore the necessary free space around the aircraft seat. This is made possible by a functional separation into a rigid load-bearing structure and an energy-absorbing device, and this can have a positive effect on the rotational behaviour of an aircraft seat in the event of a crash. Furthermore, the necessary movement can be guided to reduce kinetic energy mechanically, for example by guide rails so, upon translational loads due to an accident or a crash event, the aircraft seat can be kept substantially free of rotation in relation to the cabin floor. An improved movement behaviour is achieved by the arrangement of the force-limiting device, the guide rails further positively influencing the movement behaviour.

In a preferred embodiment, the force-limiting device comprises a dimensionally stable component and a fibre composite component, the dimensionally stable component positively engaging in the fibre composite component. The dimensionally stable component, upon an activation of the force-limiting device due to exceeding a force value, is moved through the fibre composite component. The fibre composite component is destroyed in the process with energy dissipation, so a force-limiting effect occurs. The force-limiting device is provided for a single use.

The fibre composite component is advantageously rod-shaped. This allows a light structure for the force-limiting device in one direction, which may be advantageous, in particular during a guided relative movement.

The seat surface assembly can preferably be blocked in a defined standard position in relation to the seat base. A defined standard position of the aircraft seat, which can also preferably be recognised as such from the outside by a person using suitable means, is advantageous for a defined and optimised configuration of the aircraft seat for the event of a crash, so safety can be increased and the approval outlay can be reduced. The defined standard position is adopted using appropriate regulations and handling instructions in critical flight phases, such as, for example, take-off, landing or taxiing. It may, for example, be assisted by latching, whereby deviations from the standard position due to negligence by the passengers when adopting a position can be prevented. It differs from an upright seat position generally to be adopted by a reduced tolerance in relation to deviations. The dimensionally stable component is preferably engaged in the fibre composite component in the defined standard position.

The object of the invention is furthermore achieved, proceeding from the preamble of claim 7, by the characterising features thereof. An aircraft seat with a seat assembly is proposed, the seat assembly comprising a seat base and a seat surface assembly. According to the invention, the aircraft seat has a rocking ability between the seat base and at least parts of the seat surface assembly about a transverse axis. A force-limiting mechanism is furthermore provided, which, upon an activation, allows a force-limited rocking movement of the seat surface assembly.

Upon an activation of the force-limiting mechanism by exceeding defined forces, in particular in the event of a crash, the force-limited rocking ability allows a rotational movement, which takes place with energy dissipation. As a result, the loads acting on the passenger and the structure of the aircraft seat are limited, which can act in favour of the safety of the passenger and in favour of a reduced structural weight of the aircraft seat. The rocking movement of the seat surface assembly in relation to the seat base can therefore also only be allowed in the event of a crash, i.e. at high loads or forces, in possible embodiments. The force-limited rotation preferably takes place in a defined manner about the centre of rotation of the rocking ability. This centre of rotation is in the region of the seat surface assembly and therefore comparatively high above the floor plane, so the movement envelope being produced remains small.

In advantageous embodiments, the rocking ability of the seat surface assembly can be blocked by a blocking element. The activation of the force-limiting mechanism can also take place in this embodiment if the rocking ability of the seat surface assembly is blocked by the blocking element. In a preferred embodiment, the rocking movement is spring-loaded in a non-blocked position, so the rocking movement can be brought about in this state by the weight displacement of a seated person. In this state, a rocking movement that does not activate the force-limiting mechanism is possible. In a blocked state, preferably only a force-limited rocking movement with permanent energy absorption of the force-limiting mechanism is possible.

The blocking element is preferably part of the force-limiting mechanism. This allows a light and integrated mode of construction, which, overall, allows a small number of parts and a light aircraft seat. The force-limiting mechanism therefore automatically lies in the load path as soon as the rocking ability of the aircraft seat is blocked. In general it is assumed that the aircraft seat is always in the state of a blocked rocking ability or mobility in the event of a crash. This is achieved using appropriate safety regulations or safety instructions and methods in critical flight phases, such as, for example, take-off or landing.

In possible embodiments, the force-limiting mechanism may, for example, be a metallic structure, which is arranged in the load path between the seat base and the seat surface assembly. Upon an activation of a force-limiting mechanism of this type, the metallic structure is deformed with continuous energy absorption and force limitation. A rocking movement of the seat surface assembly about a transverse axis is thus achieved. The deformation of the force-limiting mechanism is irreversible in this embodiment.

In an advantageous embodiment, the seat surface assembly is displaceable in relation to the seat base in at least one translational direction substantially parallel to a cabin floor. The aircraft seat can thus make it easier for the passenger to stand up, for example in front of a table. Substantially in parallel, this also relates, for example, to a compensation of a typical approach angle of the aircraft, so a deviation of the parallelism from the direction of the displaceability of the floor plane of the aircraft cabin of up to 10° may be produced.

In a preferred embodiment, the seat assembly comprises a rocking joint for a rocking ability of the seat surface assembly, the rocking joint allowing an additional displacement of the seat surface assembly parallel to a transverse axis. The rocking joint is one possible embodiment to achieve a rocking ability of the aircraft seat. The rocking joint has a guide for this, which can be advantageously used to allow a guided lateral displacement of the parts in relation to one another. A lateral displacement can be achieved by this with a small overall height of the seat surface assembly.

An adjustable backrest assembly is preferably arranged on the seat assembly. An adjustable backrest assembly has a substantially fixed angle with respect to a seat surface assembly, which can be adjusted by the passenger in a plurality of angle positions. During the adjusting process, the passenger temporarily cancels the fixing of the angle using a corresponding actuating element.

Furthermore, the relative movement of parts of the aircraft seat can be blocked in a defined standard position in a preferred embodiment. The relative movement of parts of the aircraft seat can inter alia be a rocking ability between the seat base and at least parts of the seat surface assembly, a displaceability of the seat surface assembly in relation to the seat base in at least one translational direction, an additional displacement of the seat surface assembly parallel to a transverse axis or the adjustment of the angle of a backrest assembly with respect to the seat assembly. The blocking or else fixing of movable parts of the aircraft seat in a defined standard position for critical flight phases allows a defined configuration of the aircraft seat and therefore favours the safety of a seated person in the event of a crash.

BRIEF DESCRIPTION OF THE DRAWINGS

The invention will be described below with the aid of preferred embodiments with reference to the accompanying figures, in which.

DETAILED DESCRIPTION OF THE INVENTION

Figure 1:
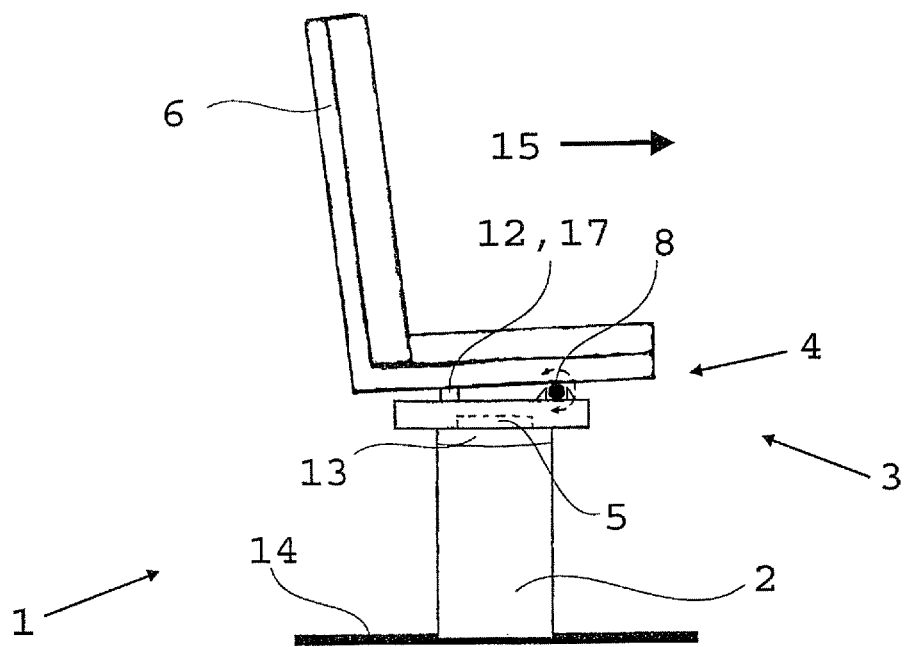
FIG. 1 shows an aircraft seat with a seat assembly.

FIG. 1 shows an advantageous embodiment of an aircraft seat 1 with a seat substructure 2, on which a seat assembly 3 is arranged. The seat assembly 3 comprises a seat base 5, which can be rigidly connected to the seat substructure 2 and can be seen in FIG. 2, as well as a seat surface assembly 4. A backrest assembly 6 is arranged on the seat surface assembly 4.

The angle between the backrest assembly 6 and the seat surface assembly 4 is advantageously adjustable. The adjustable angle allows various fixed seat angles between the backrest and seat surface, which allows different seat positions. Furthermore, armrests and/or footrests may be arranged on the seat surface assembly in alternative embodiments.

The seat substructure 2 can be connected to the floor structure of the aircraft, and is therefore secured to the aircraft when the aircraft seat is installed.

The seat surface assembly 4 may be translationally displaced in the viewing direction 15 and/or counter to the viewing direction 15 of a seated person in relation to the seat base 5, which, in this embodiment, is arranged on a fixable rotary table 13. The displaceability is braked in a normal state, the brake being able to be released by an operator or a seated person in order to move the aircraft seat 1, for example up to a possible table, not shown in the figures. The operating brakes, which, under normal operating loads, brake the translational displaceability and can also block it in this manner, typically slip in the event of a crash owing to the high load. However, they can also reduce kinetic energy.

Furthermore, the aircraft seat 1 has a rocking joint 8 in the seat surface assembly 4 in this embodiment, so the upper part of the seat surface assembly 4 can be rocked in relation to the seat base 5, the seat substructure 2 and/or the cabin floor 14, so a limited, preferably spring-loaded rotation about a transverse axis 16 is possible for this part owing to the rocking joint 8.

The rocking ability of the aircraft seat 1 may be blocked in at least one position so, for critical flight phases, such as, for example, take-off or landing, a defined standard position can or must be adopted using suitable procedures. In this embodiment, the blocking is brought about by a blocking element 12. The blocking element 12 is preferably a part of the force-limiting mechanism 17. The force-limiting mechanism 17 and the force-limiting device 9 may, in a possible embodiment, have a pot with a material filling, a punch being provided, which, upon a force-limited movement, in the event of a crash, is pressed into the pot. The material filling is compressed here over a deformation path with absorption of energy. The material filling may, for example, comprise a foam, in particular a metallic foam, or a metallic honeycomb structure., The density of the material filling preferably increases toward the pot base in at least two layers.

In a preferred embodiment, the rocking movement of the seat surface of the aircraft seat 1 is limited to 8° to the rear and 2° to the front. Furthermore, a typical approach angle of an aircraft, in which the aircraft seat 1 is used, of 2° may be compensated by the rocking joint 8. The rocking joint 8 can therefore, depending on the seat orientation, i.e. with the viewing direction 15 in or counter to the flight direction, orient the seat surface of the aircraft seat 1 perpendicular to the gravitational force during cruising. The aircraft seat 1 can therefore tilt forward, so the seat surface slopes forward, which can make it easy to stand up from the aircraft seat 1. This is furthermore assisted by the advantageous arrangement of the rocking joint 8 in the front region of the seat surface. The rocking movement is spring-loaded in this advantageous embodiment.

The rocking movement or else the freedom of the rocking joint 8 can be blocked by an operator in this advantageous embodiment so a fixed seat position of the aircraft seat 1 can be achieved in critical flight phases, such as take-off, landing or taxiing. Furthermore, a blocking of the rocking movement with a blocking element 12 in the case of a very flat seat adjustment with a large angle between the backrest assembly 6 and seat surface is advantageous in order to be able to fix the aircraft seat 1 in a reclining position, as a rocking ability is undesired in this application.

Figure 2:
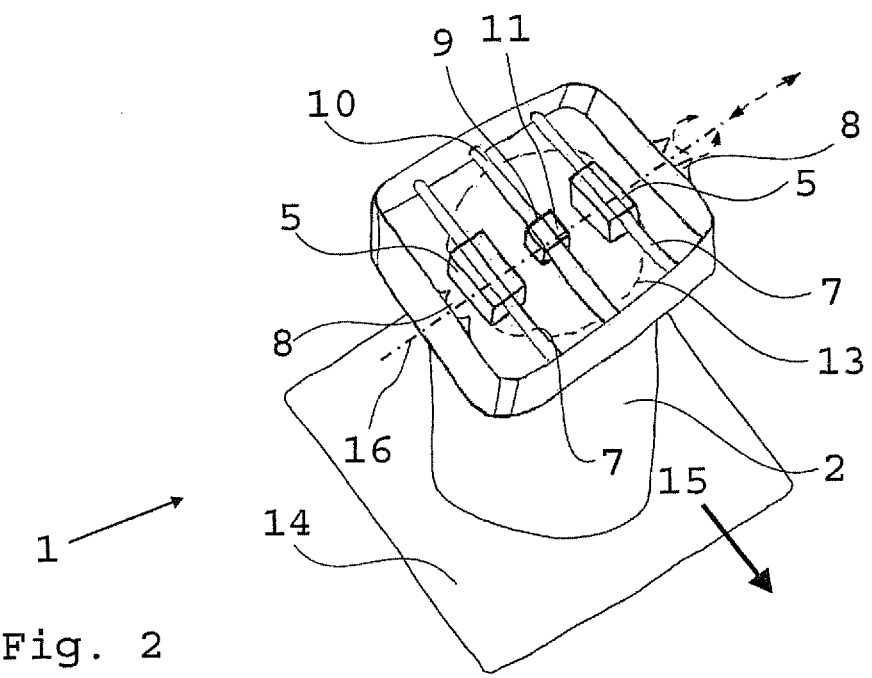
FIG. 2 shows a sectional view of an aircraft seat.

The lower part of a seat assembly 3 is shown in FIG. 2. The seat base 5 of the seat assembly 3 is formed in this embodiment by two guide elements, which are connected to the seat substructure 2 in the assembled state. The connection between the seat substructure 2 and the seat base 5 can take place by means of a rotary table 13. As a result, the seat assembly 3 can be rotated in relation to the cabin floor 14, so the usefulness and flexibility of the aircraft seat is improved. The guide elements are arranged as a seat base 5 in this embodiment on the rotary table 13 and have an operating brake, with which the translational displaceability can be blocked.

The seat assembly 3 advantageously has two guide rods 7, which are enclosed by the guide elements of the seat base 5 and allow a guided relative movement between the seat base 5 and seat surface assembly 4, so the seat surface assembly 4 is translationally displaceable in one direction, which can also include the opposite direction. The displaceability is basically braked in an advantageous embodiment, so a resistance-free translational displaceability is only produced upon manual release of the brake by the passenger. In one position, the translational displaceability can be braked and additionally blocked. For blocking, a force-limiting device 9 engages in the kinematic structure, and this blocks the movement of the seat surface assembly 4 under normal operating loads. The force-limiting device 9 may be connected for this purpose to the seat base 5 or be a part thereof.

The force-limiting device 9 is arranged centrally in the seat assembly between the guide rails 7 in this embodiment. The force-limiting device 9 advantageously consists of a rod-shaped fibre composite component 10, which is arranged parallel to the guide rails 7, and a dimensionally stable component 11, which has an attachment to the seat base 5 or to the seat substructure 2 or the rotary table 13. In an advantageous embodiment, the dimensionally stable component 11 engages in the rod-shaped fibre composite component 10 only in a position of the aircraft seat 1 that is provided for critical flight phases.

The force-limiting device 9, upon an activation, i.e. when a force limit is exceeded, allows a relative movement between the seat base 5 and seat surface assembly 4. The relative movement is force-limited and, in the event of a crash, allows kinetic energy to be absorbed, so the forces acting on the passenger in the event of a crash are limited, which can prevent injuries owing to the high accelerations occurring in the event of a crash. Furthermore, the force-limiting device 9 can be used to reduce shock loads.

In the event of an activation of the force-limiting device 9, the dimensionally stable component 11 is displaced in relation to the rod-shaped fibre composite component 10 in an energy-consuming manner in this embodiment. The fibre composite component 10 is destroyed here with the absorption of energy, for example by crushing or defibration. The direction of the relative movement is produced from the acting acceleration, the relative movement being guided by the guide rails 7.

The use of a force-limiting device to absorb energy allows the energy-absorbing movement to be separated from the mechanical structure of the aircraft seat in the event of a crash. Hitherto, the energy was generally reduced by plastic deformation of the seat frame itself. As this plastic deformability is no longer necessary, it allows the use of fibre composite materials in the mechanical structure of the aircraft seat so very light structures can be produced with high strength and rigidity and/or with small dimensions. Overall, a high design variability can be produced from this in addition to a lighter aircraft seat.

In an alternative embodiment, the force-limiting device 9 has a metallic structure or a metallic foam, which are plastically deformed with absorption of energy upon an activation.

Furthermore, very precise matching of the loads acting on the passenger can take place owing to the functional separation of absorption of energy upon a relative movement and load absorption, which was not possible in this form in the prior art owing to the necessary compromise of matching rigidity and flexibility of the mechanical structure.

The seat surface assembly 4, in an advantageous embodiment, can be displaced by the passenger transversely to the viewing direction 15 of a seated person or parallel to a transverse axis 16, so a lateral adjustment possibility exists in this regard for the passenger. This can advantageously take place by a functional integration with the rocking joint 8.

Figure 3:
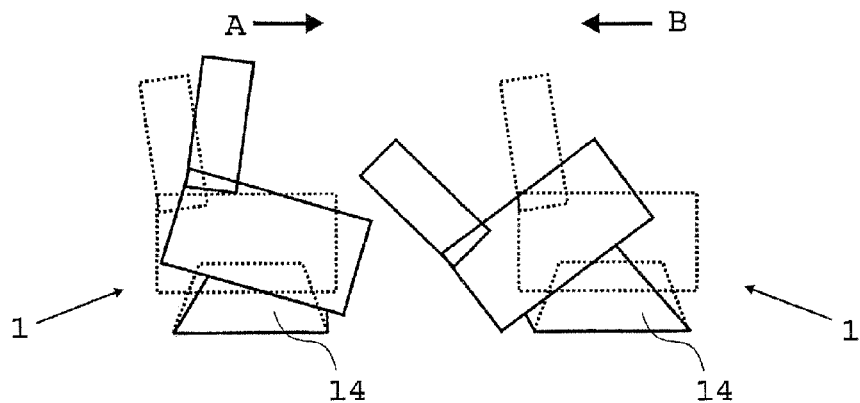
FIG. 3 shows aircraft seats from the prior art.

FIG. 3 shows an aircraft seat 1 from the prior art with a frame 14. The dotted view shows the aircraft seat 1 from the prior art in an upright seat position in a critical flight phase before a crash event. Furthermore, the aircraft seat 1 from the prior art is shown with its deformation behaviour after two possible crash events with different acceleration directions A, B of the centre of mass of a seated passenger, not shown in FIG. 3.

The frame 14 is configured to be plastically deformable to absorb the loads in the event of a crash with high accelerations. The limitation of the forces acting on a seated passenger is achieved by the flexible structure of the frame 14. Overall, a comparatively large deformation is adjusted in the lower region of the aircraft seat 1, said deformation leading to a rotation of the aircraft seat 1, the centre of rotation being low in relation to the seat surface of the aircraft seat 1, and this leads to large deflections in the upper region of the aircraft seat 1.

The deflection in the event of a crash defines the movement envelope of the aircraft seat 1 and the seated passenger that has to be kept free of items and/or objects in the cabin of the aircraft. According to the prior art, a correspondingly large movement envelope is produced. A more rigid configuration of the frame 14 is not possible according to the prior art owing to the necessary load limitation for the passenger by absorbing kinetic energy in the event of a crash.

Figure 4:
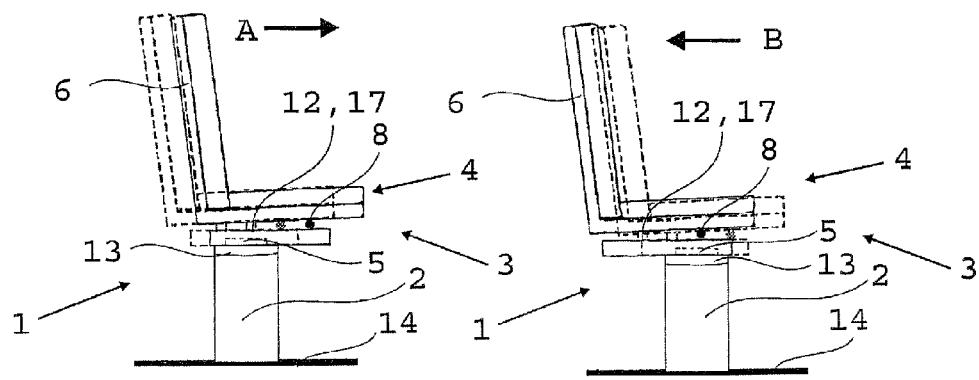
FIG. 4 shows aircraft seats with a force-limiting device.

FIG. 4 shows two aircraft seats 1, which undergo the same accelerations in the directions A, B from both crash events as the aircraft seats 1 from the prior art in FIG. 3. The force-limiting device 9, together with the guide rails 7, which run through parts of the seat base 5, allow a guided and force-limited relative movement in the event of a crash. In the event of a crash with translational loads, this leads to a limited loading of the passenger on the aircraft seat 1 and to a smaller movement envelope. Furthermore, owing to the force limitation by the force-limiting device 9 provided for this, a lower structural loading of the aircraft seat 1 is produced in the event of a crash, so the aircraft seat 1 can have a lower structural weight. In addition, the use of light and rigid materials with a small deformation potential, such as, for example, carbon fibre-reinforced plastics materials, is made possible, which can also lead to a lighter aircraft seat 1. The aircraft seats 1 are advantageously in a defined standard position before the crash event, said standard position being shown by dashed lines in each case in FIG. 4 and FIG. 5. The defined standard position can alternatively or additionally be fixed by a manual locking in one possible embodiment. In the defined standard position, any movements of parts of the aircraft seat 1 from the conventional operating loads are advantageously prevented. The crash loads to be expected in the event of a crash significantly exceed the operating loads.

Figure 5:
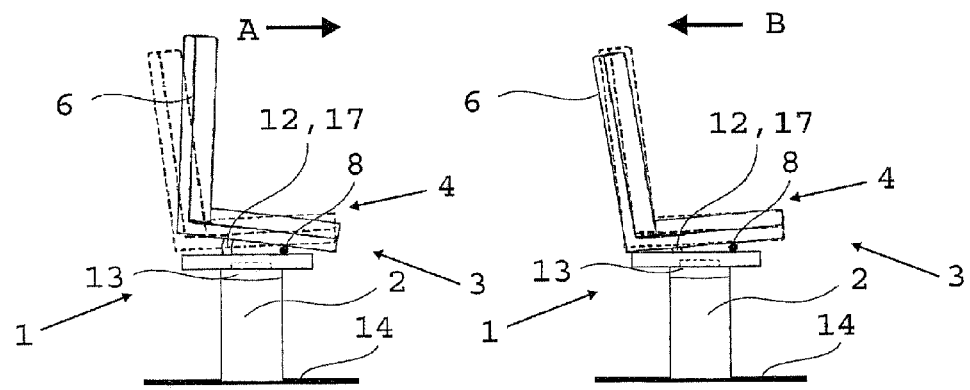
FIG. 5 shows an aircraft seat with a force-limiting mechanism.

FIG. 5 shows the aircraft seat 1 in two possible translational load cases in the directions A and B, the aircraft seat 1 having a rocking ability by means of a rocking joint 8, which is blocked by the blocking element 12 before the occurrence of the crash event. The force-limiting device in this advantageous embodiment is a part of the blocking element 12, which was activated by the loads of a crash event in the directions A and B. The activation of the force-limiting mechanism 17 allows a force-limited rocking movement from the position or else positioning of the aircraft seat 1 for critical flight phases, shown by dashed lines in FIG. 3, FIG. 4 and FIG. 5. Kinetic energy can be reduced by the force-limited movement and the load occurring for the passenger can thereby be limited. Furthermore, the force-limited movement advantageously takes place about the transverse axis 16, in which the rocking joint 8 is arranged, so a guided and force-limited movement is adjusted in the event of a crash. The movement envelope being produced is correspondingly predefined and can be kept comparatively small.

The force-limited translational displacement and the force-limited rotational rocking movement can also be used combined in a possible embodiment of an aircraft seat 1.

Owing to the force-limiting device 9 and the force-limiting mechanism 17, thick padding masses for reducing forces acting on the passenger can be dispensed with, so installation space and weight of the aircraft seat 1 can be saved. Furthermore, more diverse design possibilities are produced with respect to the padding as the relevance of the padding of the aircraft seat 1 for the crash behaviour can be reduced.

In the advantageous embodiments mentioned, the kinetic energy is advantageously absorbed at a spacing of greater than 30 cm above the cabin floor 14.

Figure 6:
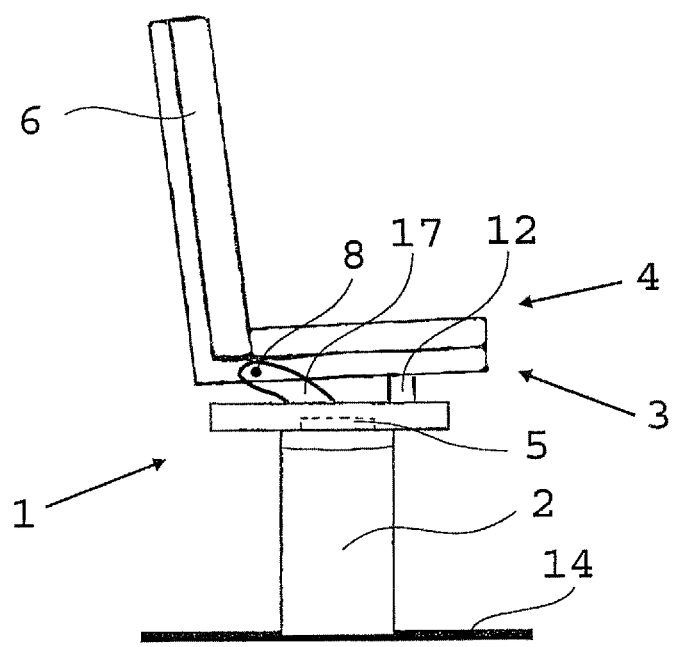
FIG. 6 shows an aircraft seat with a force-limiting mechanism.

FIG. 6 shows a possible embodiment of an aircraft seat 1, in which the force-limiting mechanism 17 is a metallic structure. The metallic structure is arranged on the two sides of the seat base 5 and preferably rigidly connected to the seat base 5 or integrally connected to the seat base 5. The force-limiting mechanism 17 has a mechanical connection to the seat surface assembly 4 on the rocking joint 8. In an alternative embodiment, the rocking joint 8 can be dispensed with as the rocking movement about a transverse axis 16 can also be allowed in this embodiment by the deformation of the banana-shaped force-limiting mechanism 17. Therefore, two rocking movements are also possible in this embodiment about different transverse axes 16. The rocking ability for adjusting the aircraft seat 1 by a passenger can be realised by the rocking joint 8, this type of rocking ability being blocked on entry into critical flight phases. In a blocked state of this type, the rocking ability for absorbing energy and for limiting the effects on the passenger in the event of a crash can nevertheless be achieved by a deformation of the force-limiting mechanism 17 if the forces occurring allow a continuous force-limited movement and energy absorption of the force-limiting mechanism 17, i.e. reach a correspondingly high level.

The force-limiting mechanism 17 therefore allows kinetic energy to be absorbed upon a rotational movement or rocking movement of the seat surface assembly 4 in relation to the seat base 5, no rotational movement of the aircraft seat about a centre of rotation being introduced in the floor region.

The claim invention is:

1. An aircraft seat, comprising:
   a seat assembly,
   wherein the seat assembly comprises:
     a seat base; and
     a seat surface assembly,
   wherein the aircraft seat is configured such that at least one part of the seat surface assembly is rockable with respect to the seat base about a transverse axis,
   wherein the transverse axis remains in a fixed position with respect to the seat base when the at least one part of the seat surface assembly rocks with respect to the seat base about the transverse axis;
   a force-limiting mechanism,
   wherein the force-limiting mechanism is configured such that upon an activation of the force-limiting mechanism, the force-limiting mechanism allows a force-limited rocking movement of the at least one part of the seat surface assembly relative to the seat base about the transverse axis; and
   a blocking element,
   wherein the blocking element is configured to block the rocking ability of the at least one part of the seat surface assembly when the blocking element is in a blocking position.

2. The aircraft seat according to claim 1,
   wherein the blocking element is part of the force-limiting mechanism.

3. The aircraft seat according to claim 2,
   wherein the seat surface assembly is displaceable in relation to the seat base in at least one translational direction substantially parallel to a cabin floor.

4. The aircraft seat according to claim 1,
   wherein the seat surface assembly is displaceable in relation to the seat base in at least one translational direction substantially parallel to a cabin floor.

5. The aircraft seat according to claim 4,
   wherein the seat assembly is configured to allow rocking of the at least one part of the seat surface assembly about a rocking joint.

6. The aircraft seat according to claim 5,
   wherein the rocking joint allows a displacement of the seat surface assembly parallel to a transverse axis of the rocking joint.

7. The aircraft seat according to claim 1,
   wherein an adjustable backrest assembly is arranged on the seat assembly.

8. The aircraft seat according to claim 1,
   wherein the aircraft seat is configured such that relative movement of the seat base and the seat surface assembly is blockable in a defined standard position.

9. The aircraft seat according to claim 1,
   wherein the seat surface assembly is displaceable in relation to the seat base in at least one translational direction substantially parallel to a cabin floor.

* * * * *